E. K. BAKER.
DEMOUNTABLE RIM.
APPLICATION FILED APR. 11, 1916.
1,314,934.
Patented Sept. 2, 1919.
2 SHEETS—SHEET 1.
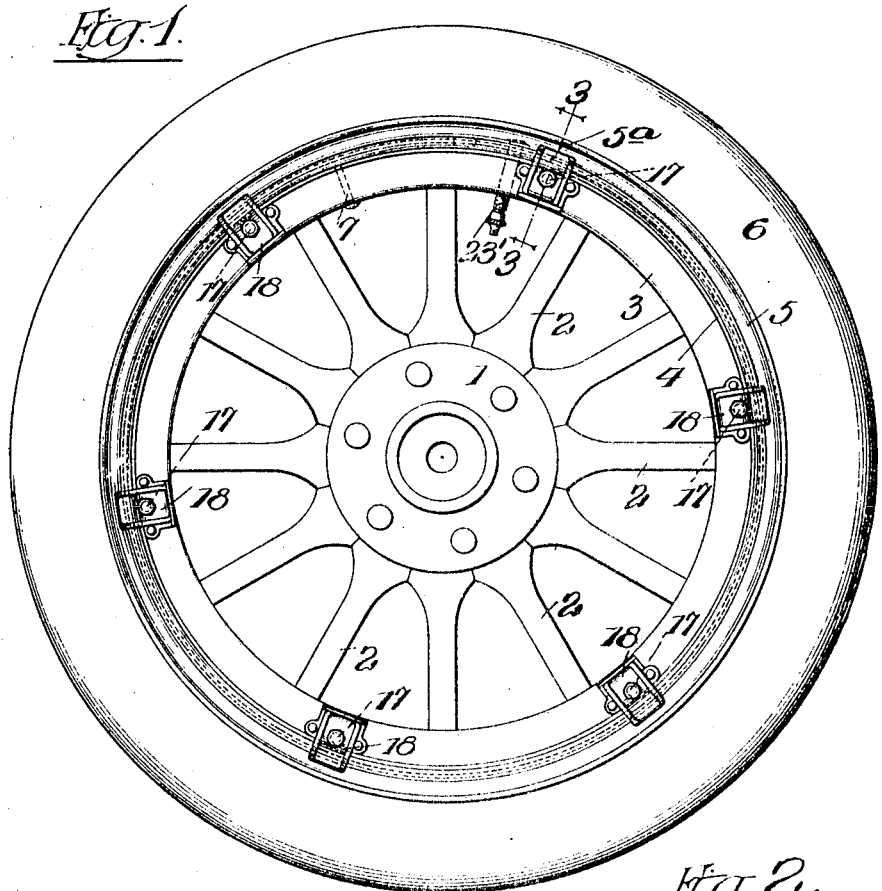
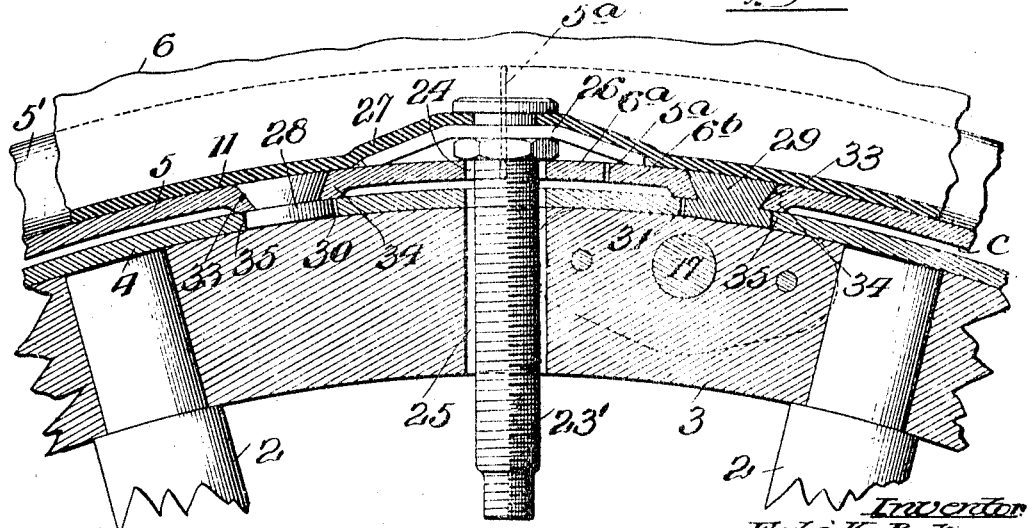

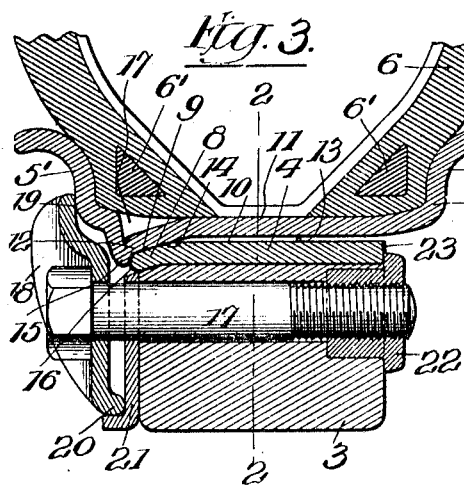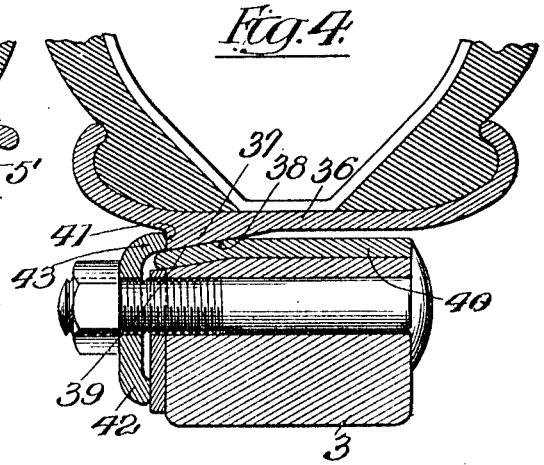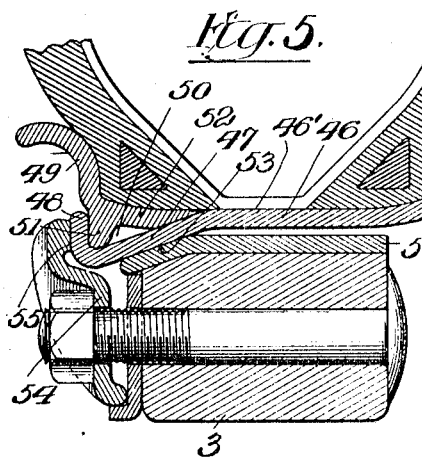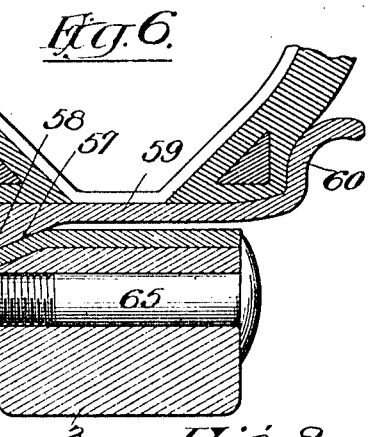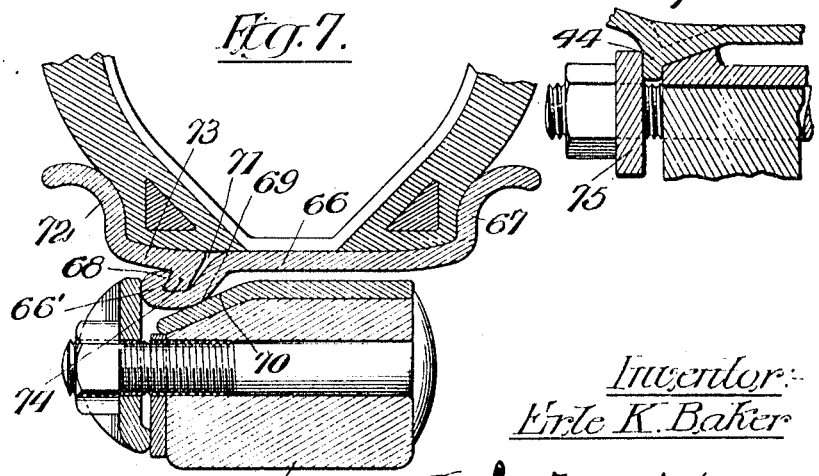

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM.

1,314,934.      Specification of Letters Patent.      Patented Sept. 2, 1919.

Application filed April 11, 1916. Serial No. 90,455.

*To all whom it may concern:*

Be it known that I, ERLE KING BAKER, a citizen of the United States, residing at Chicago, Cook county, Illinois, have invented certain new and useful Improvements in and for Demountable Rims, of which the following is a specification.

My invention relates to demountable rim constructions for motor vehicle wheels which are equipped with tires that require changing from time to time.

It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The general objects of my invention will be made clear by the following statement of the problems and needs presented by the above defined practice.

The rim should be so made that it will be easy to attach and detach the tire, particularly in the case of tires having inextensible base beads. The rim must be capable of safely and securely holding the tire, both when in service on the wheel and when being carried as an inflated "spare". The rim and wheel construction should be such that it shall be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity, and perpendicularity of the tire are not maintained, it will be found that the life of the tire is materially shortened. In addition to these requirements, it is essential that the construction shall be of the least weight consistent with the service to be performed, and it is commercially necessary that the cost of both manufacture and maintenance shall be low. It is also extremely desirable that the construction shall be such that the rim may be mounted and demounted by the operation of few parts and in the least possible time.

For use with standard clencher tires which have base beads that may be stretched over its flanges, the rim may be of the integrally flanged endless type, and, to that extent, simpler than those required for tires having non-stretchable base beads. But in all other respects, the problems remain the same; for the matters of demountability, security, non-distortion, circularity, concentricity, and perpendicularity are of equal importance as to all tires.

The specific object of my invention is to provide a demountable rim construction which shall be applicable to rims and tires of all types and which shall provide a complete solution for all of the above stated problems.

As shown hereinafter, this solution is attained in a construction wherein I take advantage of my discovery that the demountable rim is in itself capable of sustaining its cylindrical form notwithstanding the shocks which it suffers between the wheel and inflated tire, provided it properly engaged with the wheel along one circumferential line. I therefore provide the rim with only a single circumferential support on the wheel, as contrasted with the usual practice of supporting the rim at both the inner and outer sides of the wheel, which practice involves the distortion of the rim and injury to the tire, or, the inevitable looseness of some of the fastenings and rapid wear between the parts. I locate the single line of engagement on the outer edge of the fixed rim of the wheel and apply the pressure or clamping devices directly to the side of the rim, the essential point being that the rim shall be held in firm circumferential engagement with the wheel. With a mounting of this kind, the tire carrying rim may be either endless, or integrally flanged and transplit, or circumferentially split, as thought best.

The general nature and principles of my invention and also the details of the best embodiments thereof that I have thus far devised, will be readily understood on reference to the drawings that form part of this specification; all as hereinafter described, and particularly pointed out in the appended claims.

In the drawings, Figure 1 is an outer side elevation of a motor vehicle wheel embodying my invention, the same being equipped with the novel demountable rim and a pneumatic tire;—Fig. 2 is an enlarged sectional detail of the parts in the region of the valve stem of the tire, the section being on the middle or neutral plane of the wheel, as indicated by the line 2—2 on Fig. 3:—Fig. 3 is a full size cross section on the line 3—3 of Fig. 1:—Fig. 4 illustrates the adaptation of the invention to a rim of the clencher type:—Figs. 5, 6 and 7 illustrate three modifications of my invention, in each of which, the rim is provided with a detachable side flange:—and Fig. 8 illustrates a modification of the forms shown in Figs. 4, 5 and 6.

My invention is applicable to wheels of various kinds, but I have chosen to illustrate it in connection with a motor vehicle wheel of the wooden artillery type, in most common use. Such a wheel is made of a hub, 1, a number of spokes, 2, a wooden felly, 3, and a metal felly band, 4. The latter is called the fixed rim of the wheel to distinguish it from the demountable rim, 5, which carries the tire, 6. The fixed rim is tight on the felly, 3, and is usually secured by a number of radial felly bolts or rivets, one of which is shown at 7 in Fig. 1.

I shall first detail the invention as it appears in Figs. 1, 2 and 3, and thereafter explain the several modifications as depicted in the cross-sectional views of the drawing.

Unlike other fixed rims my novel felly band or fixed rim, 4, need not be wider than the felly, 3, and it has neither back flange nor outstanding rib. I prefer that it shall be made of strip stock of uniform thickness and that it shall be mainly cylindrical in form, modified only to the extent of having its outer edge, portion 8, turned or rolled inwardly; that is, toward the wheel center, as best shown in Fig. 3. This formation provides a conical surface or seat, 9, which is a narrow frustum of a cone, the large end of which merges with the cylindrical periphery, 10. As indicated hereinafter, the width of the conical or inclined surface, 9, and the angle or pitch thereof depend somewhat upon the specific design of demountable rim which is to coact therewith. The practical limitations are that the conical surface shall not be wide enough to make it difficult to dislodge the rim, 5, in case it rusts thereon, and the pitch or angle of the surface or seat should not be so great as to impose excessive strains upon the rim fastening devices hereinafter described.

As above stated, the demountable rim, 5, may be of either clencher or straight side form. As here illustrated, it is of the straight side form and has integral tire retaining flanges, 5', 5'. As it is to be used with a tire, 6, which has non-stretchable base beads, 6', this integrally flanged rim is necessarily transplit at one place in its circumference, as shown in points 5ª in Figs. 1 and 2. This peculiarity will be again referred to herein.

Whatever may be the form of its tire retaining flanges, the body, 11, of the rim, 5, is distinguished by an inwardly projecting rib, 12, formed on its inner periphery, 13, and adjacent the outer side flange thereof. This rib is provided with the conical surface or seat, 14, somewhat broader than the conical surface, 9, on the fixed rim, 4, and complementary thereto. The rib, 12, terminates in the marginal projection or stop rib, 15. This rib, 15, defines the outer end of the cone frustum, 12. The inner end of said frustum merges with the inner periphery, 13, of the rim, 5. The complementary parts and conical seats are so proportioned that the demountable rim, 5, when of the endless type, becomes a tight fit on the fixed rim, 4, before the stop rib, 15, makes contact with the extreme outer edge, 16, of the fixed rim. As hereinafter explained, the action of the rib, 15, is different in the case of a rim which is transversely split, as shown in Fig. 3.

I prefer that the ribs, 12 and 15, shall be made in the process of rolling the metal strip or sheet which composes the rim, 5, in its entirety. When so made, there is a groove, 17, in the tire seat or outer periphery of the rim, 5. This groove is covered by the outer-side base flange or bead of the tire, 6, and in the form shown, the tire seat is preserved on both sides of the groove and it is not objectionable.

On reference to Fig. 3, it will be noted that the two rims, 4 and 5, are in engagement only to the extent of the surfaces afforded by the conical seats, 9 and 14, at the outer side or edge of the wheel. To secure the demountable rim in that position, I employ a plurality of clamping bolts, 17, and preferably, as many stop or pressure lugs, 18. The latter are provided with flat ends, 19, which bear against the side of the outer flange 5', of the demountable rim. The inner ends, 20, of the lugs, 18, presagainst the side of the felly, 3. Metal washers, 21, may be interposed to prevent the marring of the wooden felly. While the inwardly turned edge, portion 8, of the fixed rim, 4, provides a strong engagement or clench with the felly, 3, I prefer that either the head or the nut, 22, of the bolt shall bear against the inner edge, 23, of the fixed rim, as shown in Fig. 3.

The pressure lugs, 18, are spaced circumferentially on the outer side of the wheel, as shown in Fig. 1, and by setting the lugs home against the demountable rim, the conical seat of the latter may be firmly driven and clamped upon the complementary seat on the edge of the fixed rim, 4; and thus the rim, 5, is both circumferentially and axially fixed concentrically on the wheel. Obviously, upon the loosening and removal of the clamping lugs, 18, the demountable rim may be readily dislodged or demounted from the wheel.

It should be understood that, as a precaution against the circumferential turning or creeping of the demountable rim on the fixed rim, a driving connection is provided between those parts. Any suitable driving connection may be used, but, as before stated, the particular rim, 5, which is shown in Figs. 1, 2 and 3, is transversely split, and, as such a rim, lends itself most readily to the employment of a driving connection which is combined with the means used to join the rim-ends. I shall not attempt to describe the several kinds of drivers which can be used only with an endless rim, but will describe the particular device shown in Fig. 2, as a typical driver which may be used with both endless and transplit rims.

The purpose in transversely splitting the rim, 5, is to allow it to be contracted and attached and detached from the tire in the now well-known manner. I prefer that the split or cut shall be of a form which causes the rim ends 6ª and 6ᵇ (see Fig. 2) to be self-alining and self-holding under the pressure of an inflated spare tire. Such a self-alining cut is indicated by the full and dotted lines, 5ª, 5ª, in Figs. 1 and 2, and is fully shown and described, and claimed, in my companion application, Serial Number 88,668, filed April 3rd, 1916. Every pneumatic tire, such as the tire 6, has a valve stem, 23′, which extends through a hole, 24, in the rim, 5, and preferably through a hole, 25, in the fixed rim and felly of the wheel. I prefer that the transverse cut, 5ª, shall be closely adjacent the valve stem hole, 24, so that the valve stem spreader, 26, may cover the part of the split, 5ª, which would otherwise be exposed within the tire (see Fig. 2). In Fig. 2 the inner tube of the tire is marked 27. It is with the interior of this that the valve stem communicates.

When the demountable rim is thus transversely split, it becomes necessary to provide means which will perform the important office of holding the ends 6ª and 6ᵇ together, when the rim, 5, is mounted on the wheel. To this end, and to form the driving connection above mentioned, I provide rim-studs with respective driving studs, 28 and 29, which fit into somewhat larger holes, 30 and 31, in the fixed rim, 4. The studs are conveniently close to the valve stem hole, and obviously, the studs and the engaged portion of the fixed rim join the rim-ends, 6ª and 6ᵇ, while positioned on the wheel, and also provide a strong driving connection between the wheel and the rim as a whole.

In my construction, the clearance space, C, between the two rims is smaller than usual, and to accommodate the driving connection to this reduced dimension, I prefer that the studs, 29, shall be round rivets fastened in respective rim ends as shown in Fig. 2. The rim ends are first formed to receive the rivets, that is, a hole is punched in each end, and the metal is thrown down to form the conical opening, 33, and a boss, 34, in each case. The rivet or stud proper fills the entire opening and the head of the rivet is smaller than the boss, 34, leaving a shoulder, 35, to bear on the fixed rim at the margin of the opening (30, 31) therein. By this means, the demountable rim is approximately spaced with respect to the fixed rim; that is, the clearance, C, is approximately determined in the region of the valve stem. The advantages of the described construction lie in its strength, cheapness and neat appearance.

It will be noted that the holes, 30 and 31, in the fixed rim, are larger than the studs, 28 and 29, which fit therein. When the demountable rim is first placed on the wheel, its rim end, 6ª and 6ᵇ, are in abutment at the split, 5ª. And the looseness of the driving studs in the holes 30 and 31 permits the rim to expand slightly when placed on the wheel. The purpose of this will be stated hereinafter.

It should also be understood that when the base portion or body of the demountable rim is continuous or endless, a single driving stud may be relied on, though even in such cases, I prefer that there shall be two studs, one on each side of the valve stem.

My invention contemplates the lateral notching of the fixed rim and felly to receive the valve stem so that the demountable rim may be slid upon the fixed rim as distinguished from a "buttoning" action. But such a notch seriously weakens the felly of the wheel, and generally it is found better to accommodate the felly stem in a radial hole, 25, in the middle plane of the wheel and to mount and demount the rim by swinging it on the hinge or pivot formed by the valve stem when in that position. These operations are known as the buttoning on and unbuttoning of the demountable rim.

As shown in Figs. 1 and 2, I prefer that the clamping lugs, 18, shall be so spaced that one thereof straddles the split or cut, 5ª, in the rim, close to the valve stem, it being desirable to there positively insure the alinement of the rim flanges under the pressure of the clamp.

In preparing the wheel to receive the demountable rim and tire, the clamping or stop lugs, 18, are first removed. The rim is then lifted, and the valve stem is inserted in the hole, 25, of the wheel. On being allowed to drop on the wheel, the driving and spacing studs, 28 and 29, enter the holes 30 and 31, in the fixed rim and coact with the valve stem in forming the temporary hinge or pivot between the rim and wheel. Thus positioned, the rim may be swung or buttoned on the wheel. The clearance, C, between the fixed and demountable rims allows this action and no difficulty attends the complete circumferential seating of the demountable rim on the described conical surface, 9, on the outer edge of the wheel. The rim, having reached that position, and by virtue of the coaction of the complementary conical seats and the space determining action of the stud shoulders, 35, will be found concentric with the wheel and perpendicular to the axis of the wheel. The rim is then fastened by replacing and setting home the several clamping lugs, 18. As these act against the side of the rim upon lines paralleling the axis of the wheel, they force the rim axially across the fixed rim, 4, until the stop rib, 15, on the rim, 5, engages the edge of the fixed rim. Obviously, the demountable rim is thereby made exactly perpendicular to the wheel axis and is forced to assume its true circular shape. This sliding movement of one conical seat on the other is permitted by the tolerance, or looseness, between the driving studs, 28 and 29, and the fixed rim of the wheel, due to the described looseness of the studs in the holes 30 and 31. In other words, the construction permits the demountable rim to open, and thus circumferentially enlarge the conical seat, 9, so that the stop rib, 15, may reach the edge of the fixed rim. It will be understood that at such times the transplit rim is under the pressure of the pneumatic tire and therefore it is pneumatically as well as positively clutched upon the conical edge seat of the wheel. The opening of the split, 5ª, when one rim is clutched on the other, is not objectionable, for, as explained, the inner tube, 27, is protected therefrom by the valve stem spreader, 26, that extends across the split. In practice, the tolerance need not exceed a sixteenth of an inch. The construction as a whole is extremely desirable, for the tolerances provided thereby make it unnecessary to observe the extreme accuracies in manufacturing the complementary rims.

When the demountable rim is thus seated, and bound upon the wheel, it acts precisely as though it were welded to the fixed rim along the outer edge thereof, and is self-sustaining as to its inner edge; that is, no support is required between the fixed and demountable rims at the inner side of the wheel. Notwithstanding the fact that the demountable rim finds a complete circular or circumferential line of contact with a support upon the wheel, it may easily be unbuttoned therefrom as soon as the clamping lugs are removed. The line of contact is so narrow that even the rusting together of the seats does not prevent the easy demounting of the rim. The clearance, C, between the rims, though relatively small, is sufficient to prevent the rusting together of the major opposed surfaces of the rims.

Fig. 4 illustrates a form of my invention in which the felly and fixed rim remain substantially the same as in Fig. 3, but the demountable rim, 36, is of the clencher shape and is made of a hot rolled section or strip, which provides a solid mounting rib, 37. The latter has the conical surface, 38, which is the complement of the conical edge seat, 39, on the fixed rim, 40. In this case, I prefer to change the shape of the clamping lug so that it may bear directly against the outer side, 41, of the rib, 37. The result of the change, from Fig. 3, is a stop or clamping lug, 42, having an outer end, 43, which may rest loosely on the edge of the fixed rim. When desired, the rim, 36, of Fig. 4, may be provided with a marginal stop, rib 44, as shown in Fig. 8, the same being similar to the rib, 15, of Fig. 3, and for the same purposes.

I use the term "mounting" as a name for the assembled ribs and conical seats, which comprise the circumferential connection between the wheel and the demountable rim. Because this mounting is confined to the outer edge of the fixed rim, it does not materially limit or prescribe the design of the overhanging flanged parts of the demountable rim, or the design of the fastening devices used therewith. In other words, the design of the rim flanges may be modified at will without modifying the form and functions of the mounting. By way of illustration, I here refer to Figs. 5, 6 and 7 of the drawings, in each of which the demountable rim is provided with one integral flange and one detachable flange. As shown, I prefer that the detachable flange shall be at the outer edge of the rim, and therefore accessible on the outer side of the wheel, but it will be apparent that the arrangement may be reversed. A demountable rim of the kind shown in Fig. 6 readily admits of such a reversal of flange positions, and by increasing the clearance between the fixed and demountable rims, still other forms of detachable-back-flange rims may be used without departing from the scope of my invention, so far as it concerns the mounting on the outer edge of the wheel.

The demountable rim shown in Fig. 5 comprises the back flange, 45, the cylindrical body portion, 46, the inwardly flanged or conical portion, 47, and the outstanding edge flange, 48, plus, the detachable flange, 49. The parts, 47 and 48, provide a groove below the tire seat, 46′, of the rim and the flange 49, is secured in this groove, being provided with the interlocking shoulder, 51, and a tire-seat-completing lateral flange, 52. The latter fills the top of the groove, 50, and receives the outer-side base-bead of the pneumatic tire. I prefer that the part, 46, together with the integral portions, 45, 47 and 48, shall be circumferentially endless, and that the flange, 48, shall be transversely split: in applying a tire to this rim, the flange, 49, is first removed. The tire is then slipped on to the part, 46, and the base beads are pushed together far enough to permit the detachable flange, 49, to be circumferentially seated in the groove, 50; whereupon the outer base bead of the tire may be distended and thus positioned upon the base flange, 52, of the part, 49. When so positioned, the tire securely fastens the detachable flange, 49, to the body of the rim. It will be understood that the base beads of the tire used with this rim are inextensible. When desired, the flange, 49, with its parts, 51 and 52, may be endless and the body of the rim may be transversely split. In either case, a driving connection is provided between the body of the rim and the fixed rim, 56, of the wheel. And in either case, the conical seating portion, 47, of the demountable rim coacts with the conical edge seat, 53, of the wheel, in the same manner as described in connection with Figs. 3 and 4. The rim is secured by a number of clamping plates or lugs, 54, having flat end faces, 55, that bear directly against the edge flange, 48, of the rim, and reinforce it against the pressure of the inflated tire.

Passing now to Fig. 6, it will be noted that the rim mounting, 57, remains the same in principle and form, but, as in Fig. 4, the rib, 58, is of solid cross section integral with the body, 59, of the rim. The edge, 59′, of the rim body is turned outwardly and toward the back flange, 60. In this manner a groove, 61, is provided in the outer edge of the rim. This groove is used for holding the detachable flange, 62, of the rim, the same being provided with a base flange or bead, 63, which fits the groove, 61. The body, 59, of the rim is transversely split and provided with driving lugs similar to those shown in Fig. 2. To those skilled in the art, it will be obvious that the rim, 59, is transversely split because it must needs be contracted before it can be removed from, or applied to, the inextensible base beads of a pneumatic tire. The detachable flange, 62, may be transversely split or endless as thought best.

For devices of the forms shown in Figs. 3 to 7, the separate clamping lugs may be dispensed with and the nuts on the bolt may be screwed directly against the side or face of the rim rib, as shown by the parts marked 64 and 65 in Fig. 6.

In Fig. 7, I have shown still another way of providing the rim with a detachable outer side flange. The body of the rim, 66, has an integral flange, 67, on its inner edge, and an integral outer edge portion, 66′, which provides a circumferential groove, 68, and which also provides the conical surface or seat, 69, complementary to the inclined or conical seat, 70, of the fixed rim. The joint, 71, between the rim body, 66, and the detachable flange, 72, is located quite near the neutral plane of the rim. The part, 72, therefore, has a tire seat, 73, within or beneath the base bead of the tire. It is also provided with an interlocking rib, 74, which extends inwardly, that is, toward the axis of the rim, and preferably outwardly, to interlock or interhook with the groove, 68, as shown. It will be clear that when seated thereon, the base of the tire securely locks the rib, 74, in the groove, 68; and that either the detachable flange, 72, or the body of the arm may be transplit, as deemed best. If the side flanges of the rim are of clencher form, the detachable flange is best made endless, in which case, the body of the rim is transplit, to readily interlock therewith. The advantages of the stop ribs, 15 and 44, may be secured by adding such ribs to the rims shown in Figs. 5, 6 and 7, and will be found desirable whenever the body portion of the rim is transversely split.

It is to be noted that all forms of my demountable rim, as herein illustrated, admit of the substitution of a clamping ring on the clamping bolts in lieu of the separate lugs and nuts depicted. Such a clamping ring is shown at 75, in Fig. 8, and is removed from the wheel when the rim is to be mounted and demounted.

The extreme simplicity and low cost of the described construction will be apparent to all who are skilled in the art; and generally, it will be apparent that by means thereof I attain all the primary objects, and fulfil all of the requirements, set forth in the opening paragraphs of this specification.

While I have illustrated and described my invention in accordance with the patent statutes, I desire it to be understood that the details of construction may be materially varied, and that many changes, modifications, and substitutions may be made in the structures herein illustrated, without departing from the spirit and scope of my invention as set forth in the appended claims.

Having thus described my invention, I claim as new, and desire to secure by Letters Patent:—

1. The herein described demountable rim and wheel construction, comprising in combination a fixed rim and a demountable rim, a suitable driving connection between said rims, said rims having circumferential conical mounting portions operatively joining them only at the peripheral outer edge of the fixed rim, being so formed and proportioned as to be elsewhere spaced from the fixed rim and being so formed and proportioned that relative axial movement of the fixed and demountable rims acts operatively to join them at said conical portions.

2. The herein described improved demountable rim construction comprising a wheel having a circumferential conical seat on the outer edge of its periphery, in combination with a suitably flanged demountable rim circumferentially contacting said wheel only upon said seat, the parts being so formed and proportioned that the major portion of the demountable rim is spaced from the fixed rim, a suitable driver for preventing circumferential creeping of the rim on the wheel and clamping means on the wheel formed to shift the demountable rim axially of the wheel and thereby operatively seat same upon said circumferential conical wheel seat.

In testimony whereof, I have hereunto set my hand this 5th day of April, 1916.

ERLE KING BAKER.